(12) United States Patent
Bao et al.

(10) Patent No.: US 12,167,461 B2
(45) Date of Patent: Dec. 10, 2024

(54) RANDOM ACCESS METHOD, RANDOM ACCESS RESPONSE METHOD, TERMINAL, AND NETWORK DEVICE

(71) Applicant: VIVO MOBILE COMMUNICATION CO., LTD., Guangdong (CN)

(72) Inventors: Wei Bao, Guangdong (CN); Yumin Wu, Guangdong (CN); Yitao Mo, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 426 days.

(21) Appl. No.: 17/548,390

(22) Filed: Dec. 10, 2021

(65) Prior Publication Data

US 2022/0104275 A1    Mar. 31, 2022

Related U.S. Application Data

(63) Continuation of application No. PCT/CN2020/094878, filed on Jun. 8, 2020.

(30) Foreign Application Priority Data

Jun. 14, 2019  (CN) .......................... 201910517640.2

(51) Int. Cl.
H04W 74/0833        (2024.01)
(52) U.S. Cl.
CPC .............................. *H04W 74/0833* (2013.01)
(58) Field of Classification Search
None
See application file for complete search history.

(56) References Cited

U.S. PATENT DOCUMENTS

| | | |
|---|---|---|
| 2018/0270869 A1 | 9/2018 | Tsai |
| 2018/0279375 A1 | 9/2018 | Jeon et al. |
| 2018/0324863 A1 | 11/2018 | Akoum et al. |
| 2019/0335515 A1 | 10/2019 | Chen et al. |
| 2020/0077444 A1 | 3/2020 | Liu et al. |
| 2020/0187266 A1 | 6/2020 | Lou et al. |
| 2021/0007145 A1 | 1/2021 | Chen |

FOREIGN PATENT DOCUMENTS

| | | |
|---|---|---|
| CN | 108282901 A | 7/2018 |
| CN | 108632987 A | 10/2018 |
| CN | 109392178 A | 2/2019 |
| CN | 109392188 A | 2/2019 |

(Continued)

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 15), 3GPP TS 36.321, Mar. 31, 2019, V15.5.0.

(Continued)

*Primary Examiner* — Angela Nguyen
(74) *Attorney, Agent, or Firm* — IP & T GROUP LLP

(57) ABSTRACT

A random access method includes: sending a random access message to a network device; receiving an RAR message from the network device, wherein the RAR message includes indication information, and the indication information indicates a format type of the RAR message; and performing a corresponding random access operation based on the indication information.

20 Claims, 11 Drawing Sheets

(56) References Cited

FOREIGN PATENT DOCUMENTS

CN 109661803 A 4/2019
WO 2013125890 A1 8/2013

OTHER PUBLICATIONS

A Single MsgB Format for both Connected and Idle&Inactive UE, 3GPP TSG-RAN WG2 Meeting #106, R2-1905652, May 13-May 17, 2019, Reno, USA. Source: vivo.
MsgB content and format, 3GPP TSG-WG2 Meeting #106, R2-1906306, May 13-17, 2019, Reno, USA. Source: ZTE, Sanechips.
Discussion on Procedure for 2-step RACH, 3GPP TSG-RAN WG1 #97, RI-1906512, May 13-17, 2019, Reno, USA. Source: CMCC.
International Search Report and Written Opinion of International Application No. PCT/CN2020/094878 mailed on Aug. 31, 2020.
First Office Action of Priority Application No. 201910517640.2 mailed on Aug. 4, 2021.
First Office Action on the Chinese Patent Application No. 202210162148.X issued by the Chinese Patent Office on Oct. 16, 2023.
Second Office Action on the Chinese Patent Application No. 202210162148.X issued by the Chinese Patent Office on Mar. 19, 2024.
R2-1800242 "Correction to random access procedures in TS 38.321", 3GPP TSG-RAN WG2 NR Ad hoc 0118, Jan. 22-26, 2018, pp. 1-10, Vancouver, Canada.
R2-1804303 "MAC Impacts: Beam Failure Recovery for SCell", GPP TSG-RAN2 101bis, Apr. 16-20, 2018, pp. 1-8, Sanya, China.
First Office Action on the Chinese Patent Application No. 202210163390.9 issued by the Chinese Patent Office on Oct. 19, 2023.
Second Office Action on the Chinese Patent Application No. 202210163390.9 issued by the Chinese Patent Office on Dec. 11, 2023.
Samsung, R2-1903113, 2 Step RA: MsgB Aspects, 3GPP TSG-RAN2 105bis, Apr. 8-12, 2019, 3GPP.
Office Action for Chinese Patent Application No. 202210162148.X issued by the Chinese Patent Office on May 30, 2024.

| R/T2 | R | RAPID | Oct1 |
|---|---|---|---|
| R | TAC | | Oct2 |
| TAC | | UL Grant | Oct3 |
| UL Grant | | | Oct4 |
| UL Grant | | | Oct5 |
| UL Grant | | | Oct6 |
| T-C-RNTI | | | Oct7 |
| T-C-RNTI | | | Oct8 |

FIG. 6B

| R | R | R | R | TAC | Oct1 |
|---|---|---|---|---|---|
| TAC | | | | | Oct2 |
| C-RNTI | | | | | Oct3 |
| C-RNTI | | | | | Oct4 |
| UE Contention Resolution ID | | | | | Oct5 |
| UE Contention Resolution ID | | | | | Oct6 |
| UE Contention Resolution ID | | | | | Oct7 |
| UE Contention Resolution ID | | | | | Oct8 |
| UE Contention Resolution ID | | | | | Oct9 |
| UE Contention Resolution ID | | | | | Oct10 |

FIG. 6C

RANDOM ACCESS METHOD, RANDOM ACCESS RESPONSE METHOD, TERMINAL, AND NETWORK DEVICE

CROSS-REFERENCE OF RELATED APPLICATIONS

This application is a Bypass Continuation Application of PCT/CN2020/094878 filed on Jun. 8, 2020, which claims priority to Chinese Patent Application No. 201910517640.2 filed on Jun. 14, 2019, which are incorporated herein by reference in their entirety.

TECHNICAL FIELD

The present disclosure relates to the field of communications technologies, and in particular, to a random access method, a random access response method, a terminal, and a network device.

BACKGROUND

Not like a 4-step RACH procedure, a new random access procedure, that is, a 2-step RACH procedure, has been introduced at present. In the 2-step RACH procedure, a terminal may trigger the 2-step RACH procedure in which a random access message is sent to a network device, and then the network device may send a random access response (RAR) message to the terminal after receiving the random access message.

However, although the 2-step RACH procedure is introduced, for content included in the RAR message is not definitive, causing incapability of the terminal to differentiate between different cases of response.

SUMMARY

According to a first aspect, an embodiment of the present disclosure provides a random access method applied to a terminal, including:
  sending a random access message to a network device;
  receiving an RAR message from the network device, where the RAR message includes indication information, and the indication information indicates a format type of the RAR message; and
  performing a corresponding random access operation based on the indication information.

According to a second aspect, an embodiment of the present disclosure provides a random access response method applied to a network device, including:
  receiving a random access message from a terminal;
  sending an RAR message to the terminal, where
  the RAR message includes indication information, and the indication information indicates a format type of the RAR message.

According to a third aspect, an embodiment of the present disclosure provides a random access method applied to a terminal, including:
  sending a random access message to a network device;
  receiving an RAR message from the network device, where the RAR message includes control information corresponding to a requirement of the terminal; and
  determining a random access procedure to be successful based on the control information.

According to a fourth aspect, an embodiment of the present disclosure provides a terminal, including:

a first sending module, configured to send a random access message to a network device;
  a first receiving module, configured to receive an RAR message from the network device, where the RAR message includes indication information, and the indication information indicates a format type of the RAR message; and
  an execution module, configured to perform a corresponding random access operation based on the indication information.

According to a fifth aspect, an embodiment of the present disclosure provides a network device, including:
  a second receiving module, configured to receive a random access message from a terminal;
  a second sending module, configured to send an RAR message to the terminal, where
  the RAR message includes indication information, and the indication information indicates a format type of the RAR message.

According to a sixth aspect, an embodiment of the present disclosure provides a terminal, including:
  a third sending module, configured to send a random access message to a network device;
  a third receiving module, configured to receive an RAR message from the network device, where the RAR message includes control information corresponding to a requirement of the terminal; and
  a determining module, configured to determine a random access procedure to be successful based on the control information.

According to a seventh aspect, an embodiment of the present disclosure provides a terminal, including a memory, a processor, and a computer program that is stored in the memory and executable on the processor, where when the computer program is executed by the processor, the steps of the random access method according to the first aspect are implemented, or the steps of the random access response method according to the second aspect are implemented, or the steps of the random access method according to the third aspect are implemented.

According to an eighth aspect, an embodiment of the present disclosure provides a non-transitory computer-readable storage medium, storing a computer program, where when the computer program is executed by a processor, the steps of the random access method according to the first aspect are implemented, or the steps of the random access response method according to the second aspect are implemented, or the steps of the random access method according to the third aspect are implemented.

DESCRIPTION OF THE DRAWINGS

To describe the technical solutions in embodiments of the present disclosure more clearly, the following briefly describes the accompanying drawings for the embodiments of the present disclosure. Clearly, the accompanying drawings in the following descriptions show merely some embodiments of the present disclosure, and a person of ordinary skill in the art may still derive other drawings from these accompanying drawings.

FIG. 6B is a third schematic diagram of a format of fallback RAR according to an embodiment of the present disclosure;

FIG. 6C is a second schematic diagram of a format of success RAR according to an embodiment of the present disclosure;

DETAILED DESCRIPTION OF EMBODIMENTS

Terms "first", "second", and the like in the description and claims of this application are used to distinguish similar objects, instead of describing a specific sequence or order. It should be understood that data used in such a way is interchangeable in proper situations, so that the embodiments of the present disclosure described herein can be implemented in sequences other than those illustrated or described herein. In addition, the terms "comprise", "include", and any variants thereof are intended to cover non-exclusive inclusion. For example, a process, a method, a system, a product, or a device that includes a series of steps or units is not necessarily limited to those steps or units listed expressly, but instead may include other steps or units not expressly listed or inherent to the process, the method, the product, or the device.

A wireless communications system in the embodiments of the present disclosure includes a terminal and a network device. The terminal may also be referred to as a terminal device or user equipment (UE). The terminal may be terminal side device such as a mobile phone, a tablet personal computer, a laptop computer, a personal digital assistant (PDA), a mobile internet device (MID), a wearable device, or a vehicle-mounted device. It should be noted that a specific type of the terminal is not limited in the embodiments of the present disclosure. The network device may be a base station or a core network. The base station may be a base station of 5G and later releases (for example, a gNB and a 5G NR NB), or a base station in other communications systems (for example, an eNB, a WLAN access point, or other access points). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. Provided that the same technical effects are achieved, the base station is not limited to specific technical vocabulary.

Figure 1:
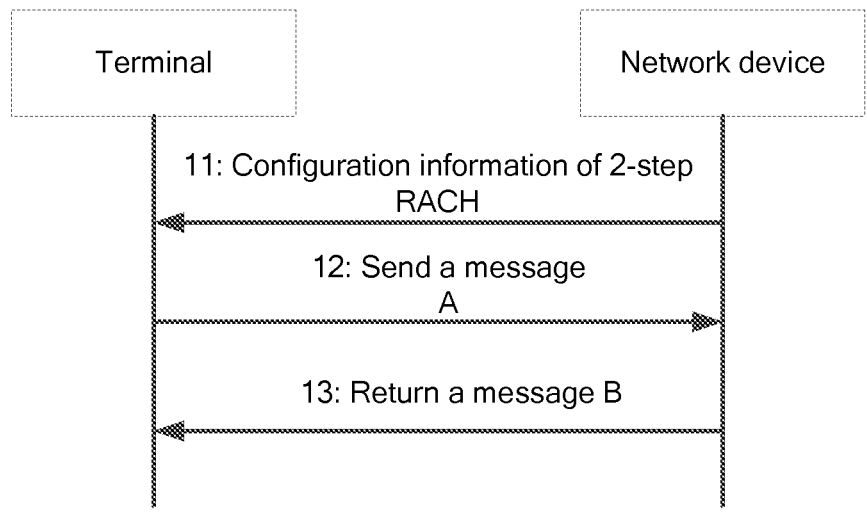
FIG. 1 is a flowchart of a 2-step RACH procedure according to an embodiment of the present disclosure.

Optionally, an applicable scenario for the embodiments of the present disclosure may be a 2-step RACH procedure. As shown in FIG. 1, the 2-step RACH procedure may include the following steps:

Step 11: A network device configures configuration information of 2-step RACH for a terminal, where the configuration information includes, for example, sending resource information corresponding to a random access message and a random access response message, the random access message may be referred to as a random access request message or MsgA, and the random access response message may be referred to as MsgB.

Step 12: The terminal triggers the 2-step RACH procedure, and sends MsgA to the network device, where MsgA may be sent through a physical uplink shared channel (PUSCH), and MsgA at least includes request data and a terminal identifier ID.

Step 13: The network device sends MsgB to the terminal. If the terminal fails to receive MsgB, the terminal may send MsgA again.

For the 2-step RACH procedure, MsgA may be equivalent to a combination of content included in Msg1 and Msg3 in a 4-step RACH procedure, and MsgB may be equivalent to a combination of content included in Msg2 and Msg4 in the 4-step RACH procedure. Responses fed back by MsgB may include any one of the following: (1) for a case in which MsgA includes common control channel (CCCH) information, MsgB may indicate at least one of: backoff indicator (BI) information, a fallback RAR message, or a success RAR message, and the success RAR message may include terminal dedicated downlink data; and (2) for a case in which MsgA includes a cell-radio network temporary identifier (C-RNTI), the network device needs to respond to the terminal, so that the network device sends scheduling signaling that includes a timing advanced command (TAC) or an uplink grant and that is for using a physical downlink control channel (PDCCH) addressed to the C-RNTI, to notify the terminal of a success contention resolution.

Optionally, after the terminal sends MsgA including the CCCH information, the terminal may listen on, in a window of MsgB, scheduling signaling for the PDCCH addressed to an RA-RNTI (PDCCH addressed to RA-RNTI):

(1) If receiving a fallback RAR message for the terminal, the terminal can perform a fallback operation, and falls back a 4-step RACH procedure;

(2) If receiving a success RAR message for the terminal, and with successful verification of a contention resolution identifier, the terminal can determine the random access procedure to be successful;

(3) If receiving a success RAR message for the terminal, and with successful verification of a contention resolution identifier, the terminal can perform a process of receiving related data based on information about an included terminal dedicated SRB or data indicated by the network device, and determine the random access procedure to be successful; and (4) If receiving no fallback RAR message or success RAR message for the terminal in the window of MsgB, the terminal can try the 2-step RACH procedure again after performing a fallback operation based on the BI information.

Optionally, after the terminal sends MsgA including the C-RNTI, the terminal may listen on, in the window of MsgB, scheduling signaling for the PDCCH addressed to the RA-RNTI and the PDCCH addressed to C-RNTI:

(1) If receiving a fallback RAR message for the terminal, the terminal can perform a fallback operation, and fall back a 4-step RACH procedure;

(2) If TAC signaling and/or uplink scheduling resources are included in the received scheduling signaling for the PDCCH addressed to the C-RNTI, the terminal can determine the random access procedure to be successful; and (3) If receiving no fallback RAR message or success RAR message for the terminal in the window of MsgB, the terminal can try the 2-step RACH procedure again after performing a fallback operation based on the BI information.

The following describes the present disclosure in detail with reference to the embodiments and accompanying drawings.

Figure 2:
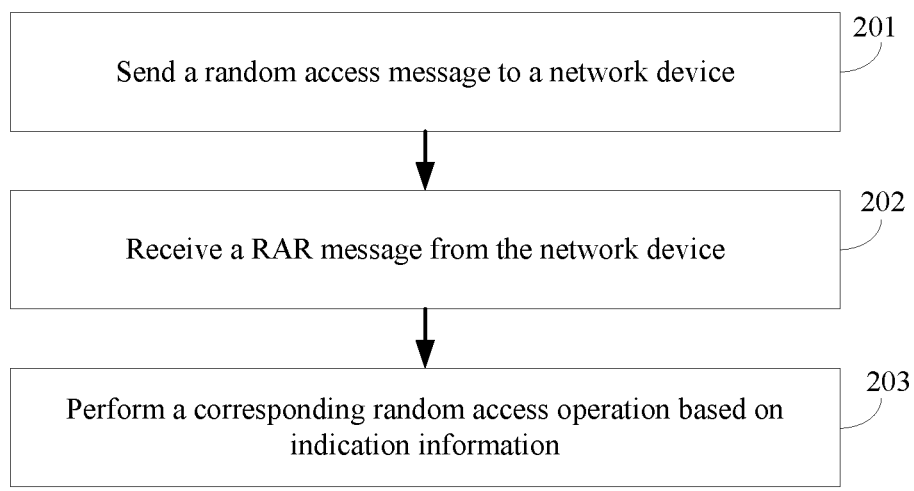
FIG. 2 is a first flowchart of a random access method according to an embodiment of the present disclosure.

Refer to FIG. 2. FIG. 2 is a flowchart of a random access method according to an embodiment of the present disclosure. The method is applied to a terminal. As shown in FIG. 2, the method includes the following steps:

Step 201: A random access message is sent to a network device.

Optionally, the random access message may be referred to as a random access request message or MsgA. The random access message may include CCCH information.

In an implementation, when the terminal is in an idle mode or inactive mode, the terminal may initiate a radio resource control (RRC) connection establishment procedure or an RRC connection recovery procedure, and at this time, a 2-step RACH procedure may be triggered, to form uplink synchronization with the network device and complete a signaling exchange procedure. When the 2-step RACH procedure is triggered, the terminal may, in MsgA, send random access preamble, and send MsgA equivalent to Msg3 in a 4-step RACH procedure on a corresponding uplink PUSCH, where MsgA carries CCCH information; and the CCCH information may be used for RRC connection establishment, RRC connection recovery, or the like.

Step 202: A RAR message is received from the network device.

Optionally, the RAR message may include indication information, and the indication information indicates a format type of the RAR message.

Step 203: A corresponding random access operation is performed based on the indication information.

According to the random access method in this embodiment of the present disclosure, the corresponding random access operation is performed based on the indication information included in the RAR message. The indication information indicates the type of format of the RAR message, so that at least content included in an RAR message in a random access procedure (for example, a 2-step RACH procedure) can be clear. Therefore, a terminal can differentiate between different cases of response from a network device, thereby reducing a latency and processing complexity in a random access procedure.

Understandably, for the network device, receiving of MsgA for the terminal may include any one of the following possible cases:

both the preamble and corresponding PUSCH content are successfully received;

the preamble is successfully received, but the corresponding PUSCH content is unsuccessfully received;

the preamble is unsuccessfully received, but the corresponding PUSCH content is successfully received; and neither the preamble nor the corresponding PUSCH content is successfully received.

According to different cases of receiving and a status of a network, the network device may response to different content, to instruct the terminal for a next action. Besides, because an RA-RNTI is calculated based on a location of a time-frequency resource for the terminal to send a preamble or MsgA, a same RA-RNTI may correspond to a plurality of terminals That is, to improve efficiency of responses, the network device may multiplex response messages to the plurality of terminals together for sending.

Optionally, content of a response from the network device to MsgA for the terminal may at least include several following items:

BI information;

a fallback RAR message;

a success RAR message; and a success RAR message and terminal dedicated data (UE dedicated data).

In at least one embodiment of the present disclosure, based on content of a response from the network device to a random access message (such as MsgA) for the terminal, the indication information included in the RAR message may at least adopt the following two forms. Descriptions are as follows:

Form 1

In the form 1, the indication information may include a first indicator field, and the first indicator field indicates that the RAR message includes the BI information or RAR information.

In an implementation, the RAR information may be selected as a random access preamble identifier (RAPID).

In an implementation, the first indicator field may be a T field included in a media access control (MAC) RAR subheader, and the T field may be referred to as a T1 field or the like.

Figure 3A:
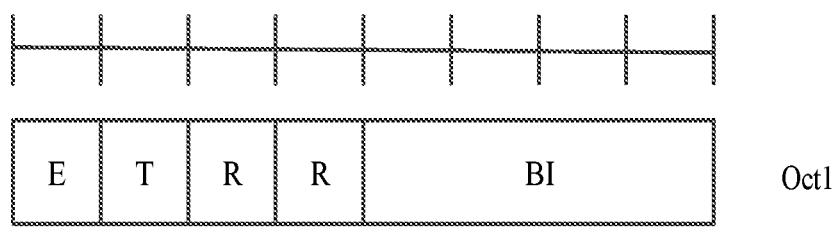
FIG. 3A is a first schematic diagram of a format of a MAC RAR subheader including beam indication (BI) information according to an embodiment of the present disclosure.

For example, refer to FIG. 3A. FIG. 3A is a schematic diagram of a format of a MAC RAR subheader including BI information. The MAC RAR subheader may at least include the following fields:

E field (such as 1 bit): used to indicate whether a current MAC subPDU is the last one, where for example, a value of the E field may be 0 or 1, 0 indicates that there is another MAC subPDU subsequently, 1 indicates that the current MAC subPDU is the last one, and remaining content are padding bits;

T field (such as 1 bit): type indication information, used to indicate that a corresponding RAR message includes BI information or MAC RAR information, where for example, if a value of the T field is 0 or 1, 0 indicates that the BI information is included, 1 indicates that the MAC RAR information is included, and a value of the T field shown in FIG. 3A is 0;

R field (such as 1 bit): a reserved bit, where for example, a value of the R field may be 0;

BI field (such as 4 bits): used to indicate fallback in a case of network overload.

Figure 3B:
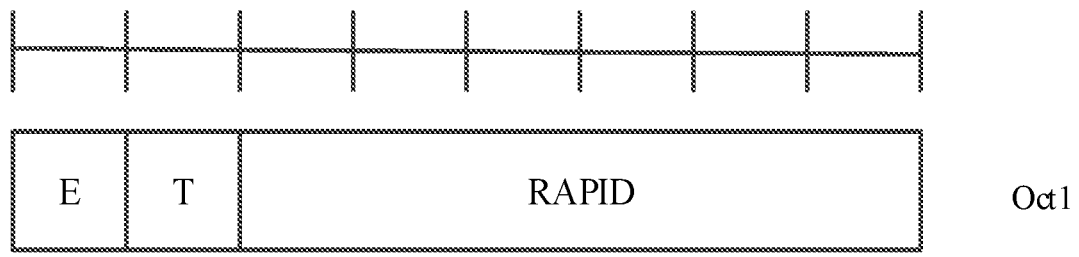
FIG. 3B is a schematic diagram of a format of a MAC RAR subheader including a RAPID according to an embodiment of the present disclosure.

For another example, refer to FIG. 3B. FIG. 3B is a schematic diagram of a format of a MAC RAR subheader including a RAPID. The MAC RAR subheader may at least include the following fields:

E field (such as 1 bit): used to indicate whether a current MAC subPDU is the last one, where for example, a value of the E field may be 0 or 1, 0 indicates that there is another MAC subPDU subsequently, 1 indicates that the current MAC subPDU is the last one, and remaining content are padding bits;

T field (such as 1 bit): type indication information, used to indicate that a corresponding RAR message includes BI information or MAC RAR information, where for example, if a value of the T field is 0 or 1, 0 indicates that the BI information is included, 1 indicates that the MAC RAR information is included, and a value of the T field shown in FIG. 3B is 1;

RAPID field (such as 6 bits): used to correspond to a preamble used by a random access message (such as MsgA). It should be noted that, if a preamble corresponding to a RAPID is a preamble specifically configured for a system information (SI) request, no MAC RAR information needs to be carried subsequently.

Optionally, in a case in which the first indicator field indicates that the RAR message includes the RAR information, the indication information may further include a second indicator field, and the second indicator field indicates that the format of the RAR message is a format of fallback RAR or a format of success RAR.

In an implementation, the second indicator field may be selected as a T2 field included in a format of a MAC RAR message (for example, a format of fallback RAR or a format of success RAR).

Optionally, in a case in which the second indicator field indicates that the format of the RAR message is the format of success RAR, the indication information may further include a third indicator field, and the third indicator field indicates whether the RAR message includes terminal dedicated data.

In an implementation, the third indicator field may be selected as a P field included in the format of success RAR.

The third indicator field may be selected as at least 1 bit. When the length of the third indicator field is 1 bit, the third indicator field indicates whether the RAR message includes the terminal dedicated data; or when the length of the third indicator field is at least 1 bit, the third indicator field indicates whether the RAR message includes the terminal dedicated data and a quantity of units of the terminal dedicated data included in the RAR message in a case in which the RAR message includes the terminal dedicated data.

Optionally, the terminal dedicated data may be at least one of a MAC service data unit (SDU) or a MAC control element (CE).

For example, if there is one unit of terminal dedicated data, the terminal dedicated data may be selected as a MAC SDU or MAC CE; or if there are a plurality of units of terminal dedicated data, the plurality of units of terminal dedicated data may all be MAC SDUs, or may all be MAC CEs, or may be that one part are MAC SDUs and the other part are MAC CEs.

Figure 4A:
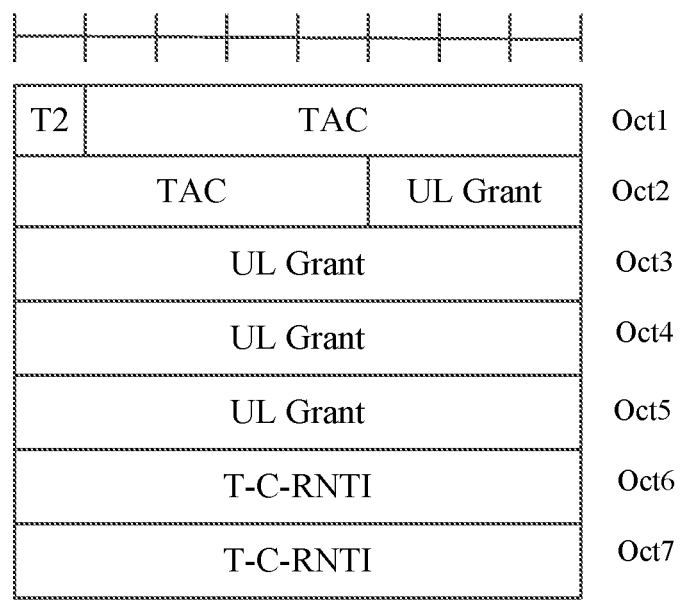
FIG. 4A is a first schematic diagram of a format of fallback RAR according to an embodiment of the present disclosure.

In an implementation, as shown in FIG. 4A, the format of fallback RAR may at least include the following fields:

T2 field (such as 1 bit): used to indicate that a format of a current MAC RAR message is the format of fallback RAR or the format of success RAR, where for example, if a value of the T2 field is 0 or 1, 0 indicates the format of fallback RAR, 1 indicates the format of success RAR, and a value of the T2 field shown in FIG. 4A is 0;

TAC field (such as 12 bits): used to send an uplink advance of the terminal;

Uplink grant field (such as 27 bits): used to allocate uplink grants for transmitting a random access message for the terminal; and T-C-RNTI (that is, Temporary C-RNTI) field (such as 16 bits): used to allocate a temporary C-RNTI for a fallback terminal (fallback UE).

Figure 4B:
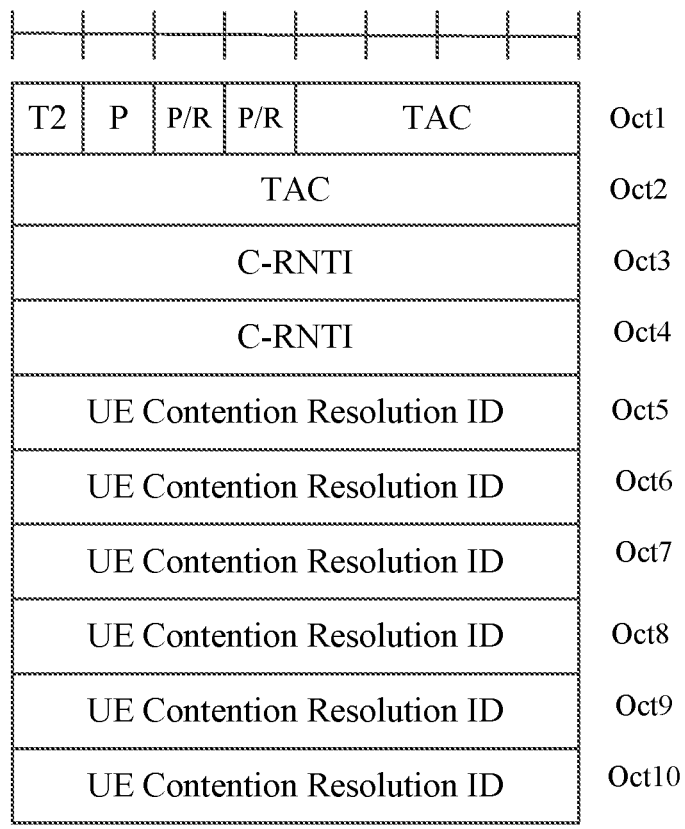
FIG. 4B is a first schematic diagram of a format of success RAR according to an embodiment of the present disclosure.

In another implementation, as shown in FIG. 4B, the format of success RAR may at least include the following fields:

T2 field (such as 1 bit): used to indicate that a format of a current MAC RAR message is the format of fallback RAR or the format of success RAR, where for example, if a value of the T2 field is 0 or 1, 0 indicates the format of fallback RAR, 1 indicates the format of success RAR, and a value of the T2 field shown in FIG. 4B is 1;

R field (such as 1 bit): a reserved bit, where for example, a value of the R field may be 0;

TAC field (such as 12 bits): used to send an uplink advance of the terminal;

C-RNTI field (such as 16 bits): used to allocate a C-RNTI for a success terminal (success UE);

Contention resolution identifier (Contention Resolution ID) field (such as 48 bits): used to send content of CCCH information in MsgA for the terminal, where if a size of the CCCH information is greater than 48 bits, first 48 bits of information in the CCCH information can be used for filling; and P field (such as, optionally, 1 bit, 2 bits, or 3 bits): used to indicate whether a corresponding RAR message includes terminal dedicated data.

It should be noted that a size of the P field may be selected based on actual cases, and may indicate different cases. How many bits are selected for the P field may be specified in a protocol, or may be configured in a system message.

For example, when the length of the P field is 1 bit, a value of the P field may be 0 or 1, where 0 indicates that a corresponding success RAR message does not include any terminal dedicated data, and the terminal dedicated data may be, for example, terminal dedicated signaling radio bearer (SRB) subPDU or data radio bearer (DRB) subPDU; and 1 indicates that a corresponding success RAR message includes one terminal dedicated SRB subPDU or DRB subPDU.

For another example, when the length of the P field is 2 bits, a value of the P field may be 00, 01, 10, or 11, where 00 indicates that a corresponding success RAR message does not include a terminal dedicated SRB subPDU and DRB subPDU, 01 indicates that a corresponding success RAR message includes one terminal dedicated SRB subPDU or DRB subPDU, 10 indicates that a corresponding success RAR message includes two units of terminal dedicated data (where the data is, for example, a SRB subPDU or DRB subPDU), and 11 indicates that a corresponding success RAR message includes three units of terminal dedicated data (where the data is, for example, a SRB subPDU or DRB subPDU).

For another example, when the length of the P field is 3 bits, a value of the P field may be 000, 001, 010, 011, 100, 101, 110, or 111, where 000 indicates that a corresponding success RAR message does not include terminal dedicated data, 001 indicates that a corresponding success RAR message includes one unit of terminal dedicated data, 010 indicates that a corresponding success RAR message includes two units of terminal dedicated data, 011 indicates that a corresponding success RAR message includes three units of terminal dedicated data, 100 indicates that a corresponding success RAR message includes four units of terminal dedicated data, 101 indicates that a corresponding success RAR message includes five units of terminal dedicated data, 110 indicates that a corresponding success RAR message includes six units of terminal dedicated data, and 111 indicates that a corresponding success RAR message includes seven units of terminal dedicated data; and the terminal dedicated data herein may be a SRB subPDU or DRB subPDU.

Figure 4C:
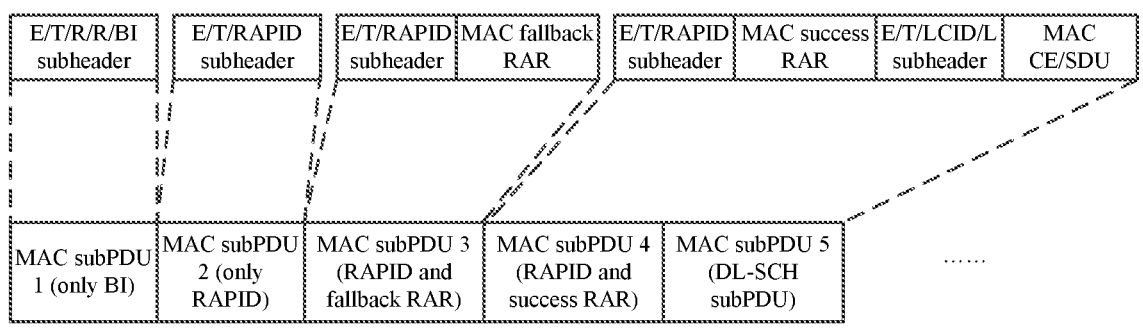
FIG. 4C is a first schematic diagram of a plurality of RAR messages multiplexed for sending according to an embodiment of the present disclosure.

In another implementation, the network device may multiplex response messages to a plurality of terminals together for sending. As shown in FIG. 4C, for example, a MAC RAR subheader (including BI information) of UE 1, a MAC RAR subheader (including RAPID) of UE 2, a fallback RAR message for UE 3, a success RAR message for UE 4, and the like are multiplexed together for sending.

It should be noted that, for the foregoing SRB subPDU or DRB subPDU, a format of MAC data subPDU may be used. The terminal may learn data about to which logical channel a corresponding subPDU belongs and a length of the data based on a logical channel identifier (LCID) and an L field, and when a value of the LCID field is special, that the corresponding subPDU is a MAC CE subPDU may further be indicated. To be specific, after the terminal reads the LCID field and L field, a size of the corresponding subPDU may be determined, and if data is of the terminal, the data can be parsed; or if data is not of the terminal, the data can be skipped, and decoding of remaining subPDUs continues, to obtain data of the terminal.

Form 2

In the form 2, the indication information may include a fourth indicator field, and the fourth indicator field indicates any one of the following:
  the RAR message includes BI information;
  the format of the RAR message is the format of fallback RAR;
  the format of the RAR message is the format of success RAR;
  whether the RAR message includes terminal dedicated data; and
  the RAR message includes a quantity of units of the terminal dedicated data.

In an implementation, the fourth indicator field may be selected as a T field included in a MAC RAR subheader, and the T field may be selected as 2 or 3 bits.

Figure 5A:
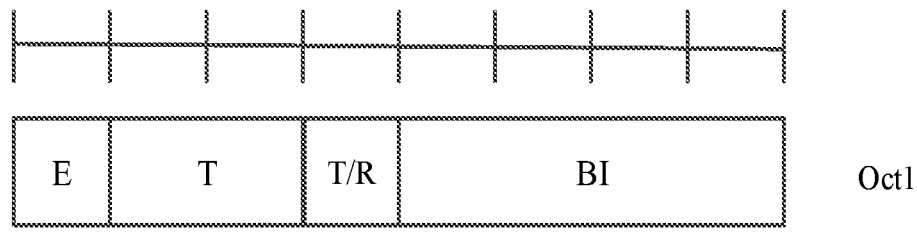
FIG. 5A is a second schematic diagram of a format of a MAC RAR subheader including BI information according to an embodiment of the present disclosure.

For example, refer to FIG. 5A. FIG. 5A is a schematic diagram of a format of a MAC RAR subheader including BI information. The MAC RAR subheader may at least include the following fields:
  E field (such as 1 bit): used to indicate whether a current MAC subPDU is the last one, where for example, a value of the E field may be 0 or 1, 0 indicates that there is another MAC subPDU subsequently, 1 indicates that the current MAC subPDU is the last one, and remaining content are padding bits;
  T field (may be 2 or 3 bits): type indication information, used to indicate whether a corresponding RAR message includes BI information, a format of the corresponding RAR message, and the like;
  R field (such as 1 bit): a reserved bit, where for example, a value of the R field may be 0;
  BI field (such as 4 bits): used to indicate fallback in a case of network overload.

Figure 5B:
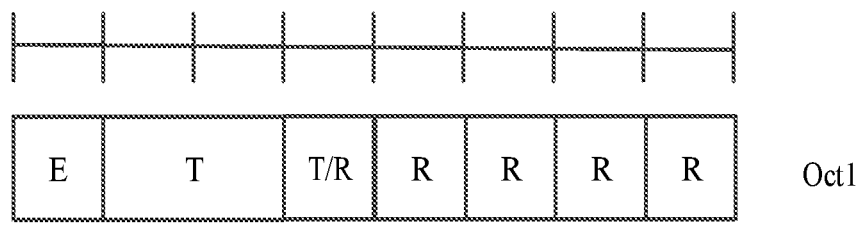
FIG. 5B is a schematic diagram of a format of a MAC RAR subheader other than one including BI information according to an embodiment of the present disclosure.

For another example, refer to FIG. 5B. FIG. 5B is a schematic diagram of a format of a MAC RAR subheader other than one including BI information. The MAC RAR subheader may at least include the following fields:
  E field (such as 1 bit): used to indicate whether a current MAC subPDU is the last one, where for example, a value of the E field may be 0 or 1, 0 indicates that there is another MAC subPDU subsequently, 1 indicates that the current MAC subPDU is the last one, and remaining content are padding bits;
  T field (may be 2 or 3 bits): type indication information, used to indicate whether a corresponding RAR message includes BI information, a format of the corresponding RAR message, and the like;
  R field (such as 1 bit): a reserved bit, where for example, a value of the R field may be 0.

An example in which the T field is 2 or 3 bits is used for description below, the T field in this embodiment is described with reference to Table 1 and Table 2 with examples.

(1) For example, the T field is 2 bits. As shown in Table 1, a value of the T field may be 00, 01, 10, or 11, where 00 indicates that a corresponding RAR message includes BI information, 01 indicates that a format of a corresponding RAR message is a format of fallback RAR, 10 indicates that a format of a corresponding RAR message is a format of success RAR, and 11 indicates that a corresponding RAR message includes one unit of terminal dedicated data, where the terminal dedicated data is, for example, a MAC SDU or MAC CE.

TABLE 1

| T field | Description |
|---|---|
| 00 | Including BI information |
| 01 | Format of fallback RAR |
| 10 | Format of success RAR |
| 11 | Including one unit of terminal dedicated data |

(2) For example, the length of the T field is 3 bits. As shown in Table 2, a value of the T field may be 000, 001, 010, 011, 100, 101, 110, or 111, where 000 indicates that a corresponding RAR message includes BI information, 001 indicates that a format of a corresponding RAR message is a format of fallback RAR, 010 indicates that a format of a corresponding RAR message is a format of success RAR, 011 indicates that a corresponding RAR message includes one unit of terminal dedicated data, 100 indicates that a corresponding RAR message includes two units of terminal dedicated data, 101 indicates that a corresponding RAR message includes three units of terminal dedicated data or reserved data, 110 indicates that a corresponding RAR message includes four units of terminal dedicated data or reserved data, and 111 indicates that a corresponding RAR message includes five units of terminal dedicated data or reserved data.

TABLE 2

| T field | Description |
|---|---|
| 000 | Including BI information |
| 001 | Format of fallback RAR |
| 010 | Format of success RAR |
| 011 | Including one unit of terminal dedicated data |
| 100 | Including two units of terminal dedicated data |
| 101 | Including three units of terminal dedicated data or reserved data |
| 110 | Including four units of terminal dedicated data or reserved data |
| 111 | Including five units of terminal dedicated data or reserved data |

It should be noted that on the basis of the foregoing fourth indicator field (for example, the T field in the MAC RAR subheader), a format of a corresponding RAR message may be the format of fallback RAR or the format of success RAR. Optionally, the format of fallback RAR may include a field similar to that shown in FIG. 4A, and the format of success RAR may include a field similar to that shown in FIG. 4B, but there are differences at least as follows:

(1) In a case in which the fourth indicator field indicates that the format of the RAR message is the format of fallback RAR, the RAR message includes a RAPID for identity verification; and (2) In a case in which the fourth indicator field indicates that the format of the RAR message is the format of success RAR, the RAR message may not include a RAPID, a reason for which is that the terminal may perform identity verification by using a contention resolution identifier field without a RAPID for identity verification, so that a RAPID may not be included.

For different types of formats of a fallback RAR message and a success RAR message, because a T field in a MAC RAR subheader is used for differentiation, and a quantity of units of included terminal dedicated data may be indicated in the T field, RAR formats may not be differentiated and indicated subsequently.

Figure 6A:
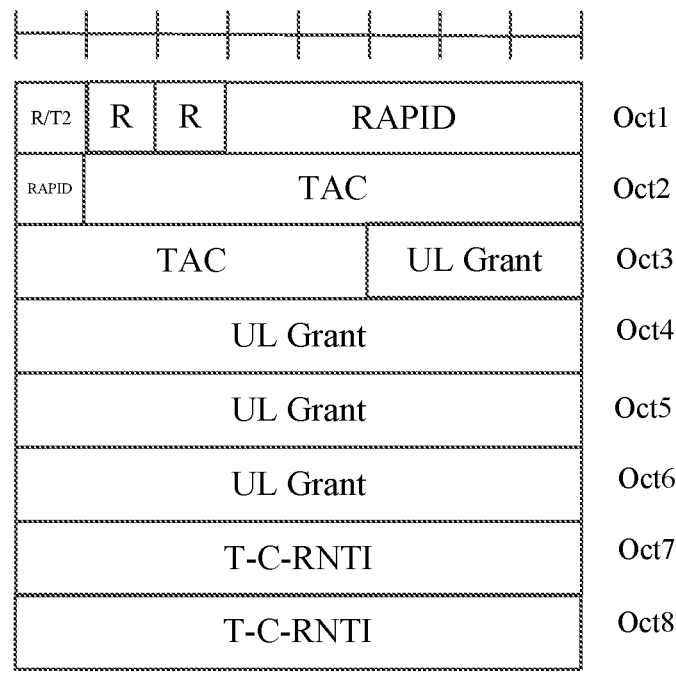
FIG. 6A is a second schematic diagram of a format of fallback RAR according to an embodiment of the present disclosure.

For example, as shown in FIG. 6A and FIG. 6B, the corresponding format of fallback RAR may at least include the following fields:

T2 field (such as 1 bit): used to indicate that a format of a current MAC RAR message is the format of fallback RAR or the format of success RAR, where for example, if a value of the T2 field is 0 or 1, 0 indicates the format of fallback RAR, 1 indicates the format of success RAR, and a value of the T2 field shown in FIG. 6A and FIG. 6B is 0; and it should be noted that, the T2 field may be replaced by an R field, and not to indicate a format of an RAR message anymore;

R field (such as 1 bit): a reserved bit, where for example, a value of the R field may be 0;

RAPID field (such as 6 bits): used to correspond to a preamble used by a random access message (such as MsgA).

TAC field (such as 12 bits): used to send an uplink advance of the terminal;

UL Grant field (such as 27 bits): used to allocate uplink grants for transmitting a random access message for the terminal; and T-C-RNTI field (such as 16 bits): used to allocate a temporary C-RNTI for a fallback terminal (fallback UE).

Figure 6D:
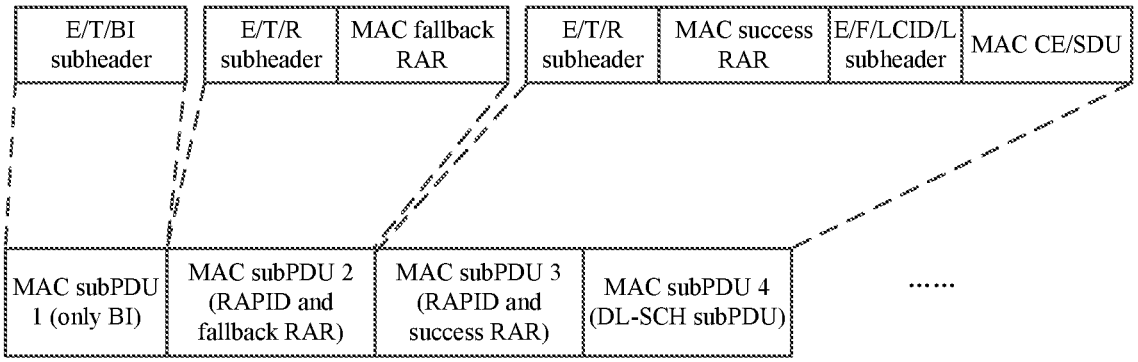
FIG. 6D is a second schematic diagram of a plurality of RAR messages multiplexed for sending according to an embodiment of the present disclosure.

For another example, as shown in FIG. 6C, the corresponding format of success RAR may at least include the following fields:

R field (such as 1 bit): a reserved bit, where for example, a value of the R field may be 0;

TAC field (such as 12 bits): used to send an uplink advance of the terminal;

C-RNTI field (such as 16 bits): used to allocate a C-RNTI for a success terminal (success UE);

Contention resolution identifier field (such as 48 bits): used to send content of CCCH information in MsgA for the terminal, where if a size of the CCCH information is greater than 48 bits, first 48 bits of information in the CCCH information can be used for filling; and In an implementation, the network device may multiplex response messages to a plurality of terminals together for sending. As shown in FIG. 6D, for example, a MAC RAR subheader (including BI information) of UE 1, a fallback RAR message for UE 2, a success RAR message for UE 3, and the like are multiplexed together for sending It can be learned from the format of success RAR shown in FIG. 6C that the format of success RAR does not include a RAPID field, and the reasons are as follows: in one aspect, in a 2-step RACH procedure, a PUSCH may carry CCCH information, and the CCCH information may include a SI request message that can be indicated without a specific preamble, such that a RAPID field may not be included, and same effects can be achieved when a contention resolution identifier in the format of success RAR is directly used to correspond to the CCCH information sent by the terminal for responding to a successful SI request of the terminal; and in another aspect, if a RAPID format is required separately, a particular value of the RAPID format may be assigned in the T field; or the separate RAPID format is classified to a format of fallback RAR first, and share a same T field indication with the format of fallback RAR, and then a first R field in the foregoing of fallback RAR is replaced with a T2 field, to indicate the separate RAPID format or usual format of fallback RAR, and as shown in FIG. 6A and FIG. 6B, the separate RAPID format only needs one byte, where the last six bits are the RAPID field, the first bit is type indication information, and the second bit is an R (reserved) bit.

It should be noted that in the foregoing embodiments, an MAC RAR subheader and an MAC RAR are each ordered with integer bytes separately, so that each are with a plurality of R bits. If the MAC RAR subheader and the MAC RAR are integrated, a design for respective independence of the MAC RAR subheader and the MAC RAR is changed, but this can reduce a whole length and a size of an R bit, thereby reducing overheads.

Figure 7:
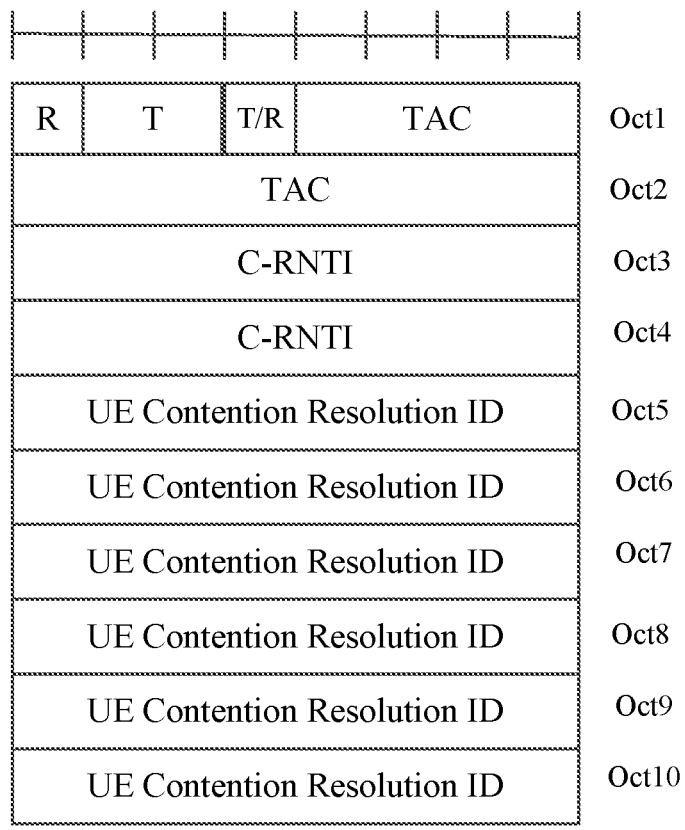
FIG. 7 is a schematic diagram of a format of integrated MAC RAR subheader and MAC RAR according to an embodiment of the present disclosure.

In an implementation, an example of a success RAR message is used. A format of an integrated MAC RAR subheader and MAC RAR can be seen in FIG. 7. As shown in FIG. 7, the corresponding format after integration may be understood as that an integration of a MAC RAR subheader shown in FIG. 5B and the format of success RAR shown in FIG. 6C. In this case, actions of the terminal are not changed, only an RAR format is changed, and included content of a response is also similar. A biggest difference is that a RAPID is not included in a success RAR message any more, which is mainly because an RAPID can only be used to initially determine a preamble for corresponding uplink a terminal, but actually two terminals may use a same preamble, so that checking of a contention resolution identifier is still required for final determination of a terminal identity, and therefore, a success RAR message carrying no RAPID does not impact final determination of a terminal.

In at least one embodiment of the present disclosure, step 203 may include at least one of:
- in a case in which the indication information indicates that the RAR message includes BI information, performing a fallback operation based on the BI information;
- in a case in which the indication information indicates that the format of the RAR message is the format of fallback RAR, performing a fallback operation;
- in a case in which the indication information indicates that the format of the RAR message is the format of success RAR, when the RAR message includes a contention resolution identifier and the contention resolution identifier is verified successfully, determining a random access procedure to be successful;
- in a case in which the indication information indicates that the format of the RAR message is the format of success RAR, when the RAR message includes a RAPID and a contention resolution identifier and the RAPID and the contention resolution identifier are verified successfully, determining a random access procedure to be successful;
- in a case in which the indication information indicates that the format of the RAR message is the format of success RAR, when the RAR message includes a contention resolution identifier and the contention resolution identifier is verified successfully, if the RAR message includes terminal dedicated data, performing a process of receiving related data based on information about the terminal dedicated data indicated by the indication information; or
- in a case in which the indication information indicates that the format of the RAR message is the format of success RAR, when the RAR message includes a RAPID and a contention resolution identifier and the RAPID and the contention resolution identifier are verified successfully, if the RAR message includes terminal dedicated data, performing a process of receiving related data based on information about the terminal dedicated data indicated by the indication information.

In this way, by using the indication information included in the RAR message, a terminal can differentiate between different cases of response from a network device and perform according processing, thereby reducing a latency and processing complexity in a random access procedure.

The following is described in detail actions of the terminal with an example of a 2-step RACH procedure.

(1) If the terminal sends a special preamble for a SI request, the terminal may use the preamble and/or a related RNTI to parse a PDCCH in a window of MsgB; and if a RAPID corresponding to the preamble of the terminal is detected to be included in a response message, the terminal determines that the network device has correctly received the SI request, and waits to receive a SI subsequently, and a random access procedure for the SI request is successful.

(2) If MsgA sent by the terminal includes CCCH information, where the CCCH information is used for an RRC connection establishment request, an RRC connection recovery request, a SI request message similar to a conventional Msg3, or the like, the terminal may use a preamble and/or a related RNTI to parse a PDCCH in a window of MsgB; and if a RAPID corresponding to the preamble of the terminal is detected to be included in a response message:
- if an RAR format corresponding to the RAPID is the format of fallback RAR, the terminal may fall back to a 4-step RACH procedure and initiates Msg3 transmission according to a UL grant indicated in the format of fallback RAR; or
- if an RAR format corresponding to the RAPID is the format of success RAR, the terminal may parse an RAR message according to the format of success RAR, and compare bit streams carried in a contention resolution identifier with CCCH information sent by the terminal, where if the comparison is successful, contention resolution is determined to be successful, and a random access procedure is successful, or if the comparison is unsuccessful, the RAR message is determined to be not a response message to the terminal, and listening goes on, where it should be noted that, if contention resolution is successful, and a success RAR message further includes extra downlink shared channel (DL-SCH) data, the terminal may parse each unit of the DL-SCH data based on a quantity of units of terminal dedicated data indicated in an RAR, and submit the data to a higher layer for processing; and
- if the RAPID does not correspond to the preamble of the terminal, or contention resolution is unsuccessful, the terminal may skip an RAR format not belonging to the terminal and possible DL-SCH format in turn based on an indication of each RAR format and a head indication, and try subsequent RAPID comparison and RAR parsing, till a response to the terminal is found.

(3) If any RAR message corresponding to the RAPID of the terminal is not received in a window of MsgB by the terminal, or no contention resolution is successful, the terminal may determine that a random access procedure is unsuccessful, perform a specific random delay based on BI information received in the window of MsgB, initiate a next unsuccessful random access, failing till a preset maximum quantity of times of random access is reached, and report the random access failures to a higher layer.

Figure 8:
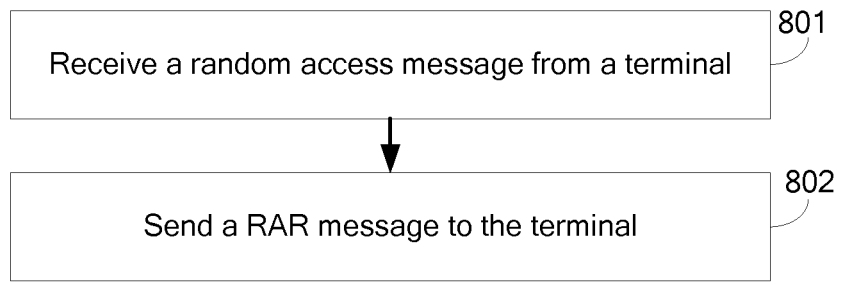
FIG. 8 is a flowchart of a random access response method according to an embodiment of the present disclosure.

Refer to FIG. 8. FIG. 8 is a flowchart of a random access response method according to an embodiment of the present disclosure. The method is applied to a network device. As shown in FIG. 8, the method includes the following steps:

Step 801: A random access message is received from a terminal.

Step 802: A RAR message is sent to the terminal.

Optionally, the RAR message includes indication information, and the indication information indicates a format type of the RAR message.

According to the random access response method in this embodiment of the present disclosure, by using the indication information included in the RAR message, at least content included in an RAR message in a random access procedure (for example, a 2-step RACH procedure) can be clear. Therefore, a terminal can differentiate between different cases of response from a network device, thereby reducing a latency and processing complexity in a random access procedure.

In this embodiment of the present disclosure, optionally, the indication information includes a first indicator field, and the first indicator field indicates that the RAR message includes the BI information or RAR information.

Optionally, the RAR information includes a RAPID.

Optionally, in a case in which the first indicator field indicates that the RAR message includes the RAR information, the indication information may include a second indicator field, and the second indicator field indicates that the format of the RAR message is a format of fallback RAR or a format of success RAR.

Optionally, in a case in which the indication information indicates that the format of the RAR message is the format of success RAR, the indication information may further include a third indicator field, and the third indicator field indicates whether the RAR message includes terminal dedicated data.

Optionally, when the length of the third indicator field is 1 bit, the third indicator field indicates whether the RAR message includes the terminal dedicated data; or when the length of the third indicator field is at least 1 bit, the third indicator field indicates whether the RAR message includes the terminal dedicated data and a quantity of units of the terminal dedicated data included in the RAR message in a case in which the RAR message includes the terminal dedicated data.

In this embodiment of the present disclosure, optionally, the indication information includes a fourth indicator field, and the fourth indicator field indicates any one of the following:

the RAR message includes BI information;
the format of the RAR message is the format of fallback RAR;
the format of the RAR message is the format of success RAR;
whether the RAR message includes terminal dedicated data; and
the RAR message includes a quantity of units of the terminal dedicated data.

Optionally, in a case in which the indication information indicates that the format of the RAR message is a format of fallback RAR, the RAR message includes a RAPID; or
in a case in which the indication information indicates that the format of the RAR message is a format of success RAR, the RAR message does not include the RAPID.

Optionally, the terminal dedicated data is at least one of a MAC SDU or a MAC CE.

Figure 9:
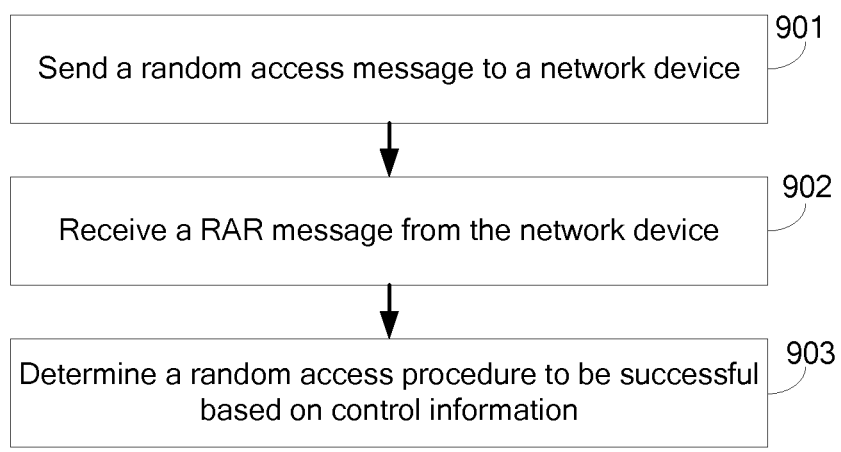
FIG. 9 is a second flowchart of a random access method according to an embodiment of the present disclosure.

Refer to FIG. 9. FIG. 9 is a flowchart of a random access method according to an embodiment of the present disclosure. The method is applied to a terminal. As shown in FIG. 9, the method includes the following steps:

Step 901: A random access message is sent to a network device.

Optionally, the random access message may be referred to as a random access request message, Msg1, or MsgA. The random access message may include a C-RNTI.

Step 902: A RAR message is received from the network device.

Optionally, the RAR message includes control information corresponding to a requirement of the terminal.

Step 903: A random access procedure is determined to be successful based on the control information.

According to the random access method in this embodiment of the present disclosure, by using the control information included in the RAR message, at least content included in an RAR message in a random access procedure (for example, a 2-step RACH procedure) can be clear. Therefore, a terminal can differentiate between different cases of response from a network device, thereby reducing a latency and processing complexity in a random access procedure.

In this embodiments of the present disclosure, optionally, the control information may include, but is not limited to, any one of the following items:

scheduling signaling for parsing a PDCCH by using a C-RNTI;
a TAC MAC CE;
scheduling signaling on new beam resources in a case of beam failure recovery;
a TAC of a preset length; and
a TAC of a preset length and an uplink scheduling grant.

In an implementation, when the terminal is in an RRC connected mode, triggered by arrival of uplink data or beam failure recovery, the terminal may also initiate a random access procedure. MsgA for the terminal in the connected mode usually includes a C-RNTI of the terminal, to notify the network device an identity of the terminal. In addition, MsgA may further include a buffer status report (BSR) or some information about bean failure, to make the network device respond based on a requirement of the terminal after the information is received.

In an example of 2-step RACH, for MsgA including the C-RNTI, a possible response is that the network device delivers uplink scheduling signaling for a PDCCH addressed by the C-RNTI (PDCCH addressed by C-RNTI) to the terminal. If the terminal receives uplink scheduling signaling dedicated to the terminal, the terminal may determine that the network device correctly receives MsgA, further determine the 2-step RACH procedure to be successful, and perform corresponding transmission subsequently based on network scheduling.

In a case of beam failure recovery, after receiving MsgA for the terminal, the network device may send, on corresponding new beam resources after the beam failure recovery, scheduling signaling for a PDCCH addressed to a C-RNTI to the terminal, where the scheduling signaling may be uplink, or may be downlink Because a response message is sent on the new beam resources, after receiving the response message, the terminal may determine that MsgA is successfully received, and further determine the random access procedure to be successful.

In addition, because MsgA includes a preamble, the network device may perform update calculation on an uplink synchronous TA of the terminal after the preamble is received, or may send a conventional TAC MAC CE to the terminal for adjustment of a TA by the terminal. Therefore, after sending MsgA including the C-RNTI, the terminal may determine a corresponding random access procedure to be successful if a TAC MAC CE dedicated to the terminal sent by the network device is received in the window of MsgB.

In another implementation, for the terminal in the connected mode, when the terminal is currently in an uplink asynchronous state, the network device needs to send TA information to the terminal, where the TA information is different from a TAC included in a conventional MAC CE. The conventional TAC is used for adjusting a currently existing TA, and is an offset, but before uplink synchronization is established, an initial value of a TA is required. The TAC of the conventional MAC CE is 6 bits, but a preset length of a TAC for establishing initial synchronization is, for example, 12 bits. For example, a TAC included in a MAC RAR message is 12 bits.

In this case, to respond to MsgA for the terminal, the network device may send one piece of TAC signaling of a preset length, for example, particular TAC signaling of 12 bits, used by the UE to establish initial uplink synchronization Correspondingly, the terminal may determine the random access procedure to be successful based on the particular TAC signaling of 12 bits.

Optionally, the TAC of the preset length may be indicated by using an LCID.

Figure 10A:
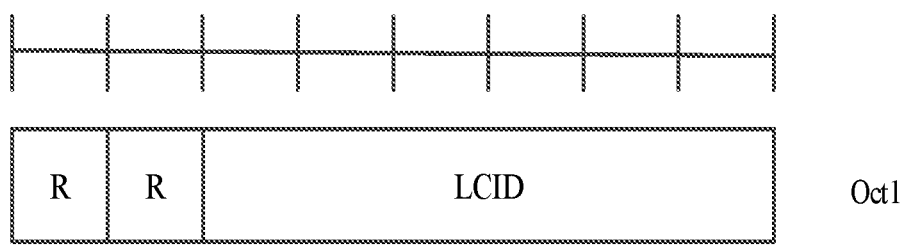
FIG. 10A is a first schematic diagram of a format of a MAC subheader according to an embodiment of the present disclosure.
Figure 10B:
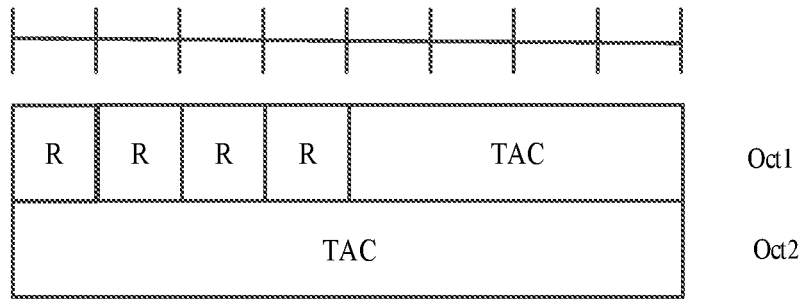
FIG. 10B is a first schematic diagram of a format of a MAC CE according to an embodiment of the present disclosure.

In an implementation, an example of a TAC of 12 bits is used. As shown in FIG. 10A, one particular LCID indicator field may be allocated in a MAC subheader, to indicate the TAC of 12 bits. A corresponding MAC CE format may be as shown in FIG. 10B, where the MAC CE format includes the TAC of 12 bits.

Figure 10C:
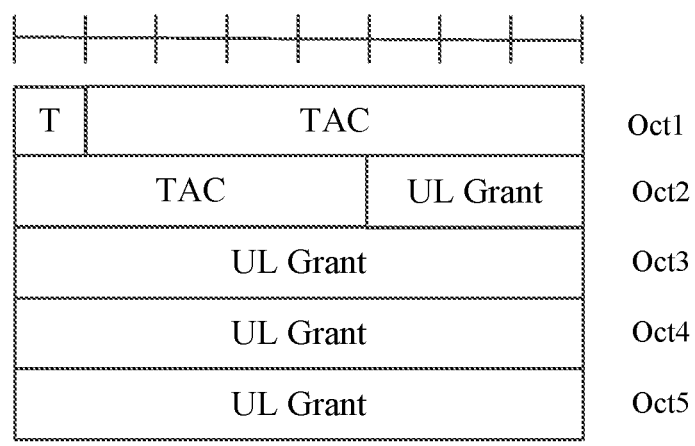
FIG. 10C is a second schematic diagram of a format of a MAC CE according to an embodiment of the present disclosure.

The MAC CE format including the TAC of 12 bits may further include a T field (such as 1 bit) and a UL Grant field (such as 27 bits). As shown in FIG. 10C, the T field indicates that a TAC field is independently included, or a TAC field and a UL Grant field are included.

It should be noted that a format of the UL Grant may further use forms other than the foregoing forms, for example, a form of a downlink control information (DCI) grant MAC CE, at least including a time-frequency resource location, a HARQ process identifier, a redundancy version (RV), a supplement uplink (SUL) indication, and other information.

In addition, in this embodiment, two special LCID indications may alternatively be used to indicate whether there is a TAC of 12 bits or there are a TAC of 12 bits and a UL Grant; or L fields are included in the MAC subheader, to indicate, based on different lengths of L fields, whether there is independently a TAC of 12 bits or there are a TAC of 12 bits and a UL Grant.

Optionally, the TAC of the preset length may be indicated by using a first indicator field in a MAC header.

In an implementation, the first indicator field may be a first R field in the MAC subheader, and is indicated by a value different from the first R field.

Figure 11A:
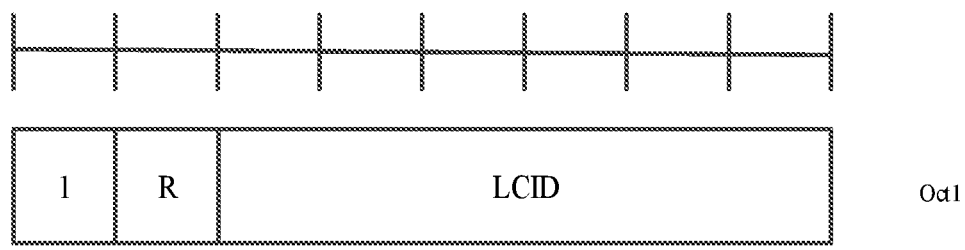
FIG. 11A is a second schematic diagram of a format of a MAC subheader according to an embodiment of the present disclosure.
Figure 11B:
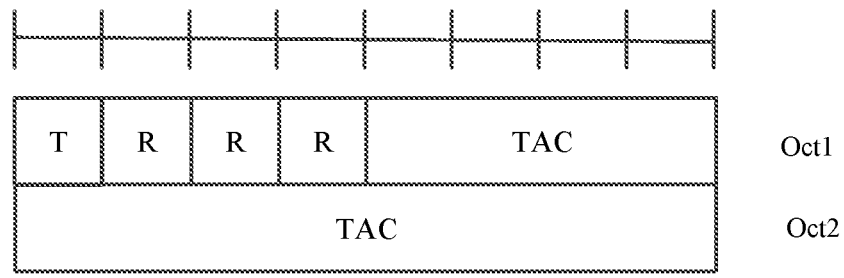
FIG. 11B is a first schematic diagram of a format of a MAC subPDU according to an embodiment of the present disclosure.

Data transmitted on a DL-SCII usually starts with a MAC subheader, and first bits of all MAC subheaders are R fields with a value of 0. Therefore, to find a TAC of 12 bits as quick as possible, as shown in FIG. 11, the first R field of the MAC subheader is set to 1. A corresponding MAC subPDU format may be as shown in FIG. 11B, where the MAC subPDU format includes the TAC of 12 bits.

Figure 11C:
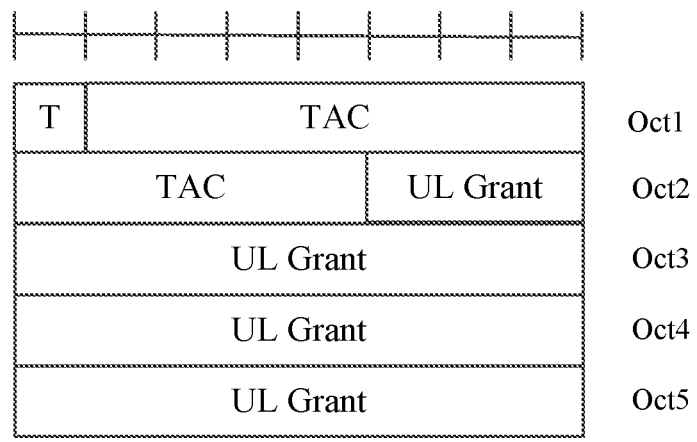
FIG. 11C is a second schematic diagram of a format of a MAC subPDU according to an embodiment of the present disclosure.

The MAC subPDU format including the TAC of 12 bits may further include a T field (such as 1 bit) and a UL Grant field (such as 27 bits). As shown in FIG. 11C, the T field indicates that a TAC field is independently included, or a TAC field and a UL Grant field are included.

It can be understood that, any of foregoing MAC CE formats or MAC subPDU formats may be used by the terminal to learn that the special TAC of 12 bits (or the UL Grant is further) included. For the terminal that sends MsgA, if the TAC of 12 bits included in the scheduling signaling for the PDCCH addressed to the C-RNTI is received, the terminal can determine the random access procedure to be successful.

In this embodiment, besides listening on a C-RNTI of the terminal, the terminal may further listen on an RA-RNTI for addressing a PDCCH at the same time; and if a fallback RAR message for the terminal is received, the terminal may perform a fallback operation. If neither a fallback RAR message nor a success RAR message is received in a window of MsgB by the terminal, the terminal may determine a random access procedure to be unsuccessful, and retry a random access procedure based on a backoff delay indicated by a BI.

The foregoing establishments describe the random access method and the random access response method in the present disclosure. A terminal and a network device in the present disclosure are described below with reference to the embodiments and accompanying drawings.

Figure 12:
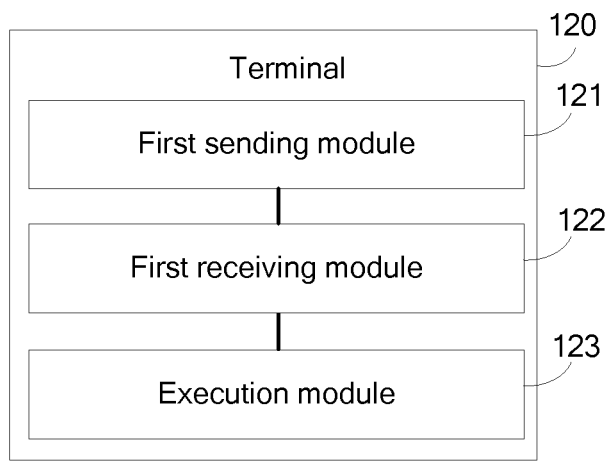
FIG. 12 is a first schematic structural diagram of a terminal according to an embodiment of the present disclosure.

Refer to FIG. 12. FIG. 12 is a schematic structural diagram of a terminal according to an embodiment of the present disclosure. As shown in FIG. 12, the terminal 120 includes:

a first sending module 121, configured to send random access message to a network device;

a first receiving module 122, configured to receive an RAR message from the network device, where the RAR message includes indication information, and the indication information indicates a format type of the RAR message; and an execution module 123, configured to perform a corresponding random access operation based on the indication information.

For the terminal in this embodiment of the present disclosure, the corresponding random access operation is performed based on the indication information included in the RAR message. The indication information indicates the type of format of the RAR message, so that at least content included in an RAR message in a random access procedure (for example, a 2-step RACH procedure) can be clear. Therefore, different cases of response from a network device can be differentiated, thereby reducing a latency and processing complexity in a random access procedure.

In this embodiment of the present disclosure, optionally, the indication information includes a first indicator field, and the first indicator field indicates that the RAR message includes backoff indicator BI information or RAR information.

Optionally, the RAR information includes a RAPID.

Optionally, in a case in which the first indicator field indicates that the RAR message includes the RAR information, the indication information may include a second indicator field, and the second indicator field indicates that the format of the RAR message is a format of fallback RAR or a format of success RAR.

Optionally, in a case in which the indication information indicates that the format of the RAR message is the format of success RAR, the indication information may further include a third indicator field, and the third indicator field indicates whether the RAR message includes terminal dedicated data.

Optionally, when the length of the third indicator field is 1 bit, the third indicator field indicates whether the RAR message includes the terminal dedicated data; or when the length of the third indicator field is at least 1 bit, the third indicator field indicates whether the RAR message includes the terminal dedicated data and a quantity of units of the terminal dedicated data included in the RAR message in a case in which the RAR message includes the terminal dedicated data.

Optionally, the indication information may include a fourth indicator field, and the fourth indicator field indicates any one of the following:
the RAR message includes BI information;
the format of the RAR message is the format of fallback RAR;
the format of the RAR message is the format of success RAR;
whether the RAR message includes terminal dedicated data; and
the RAR message includes a quantity of units of the terminal dedicated data.

Optionally, in a case in which the indication information indicates that the format of the RAR message is a format of fallback RAR, the RAR message includes a RAPID; or
in a case in which the indication information indicates that the format of the RAR message is a format of success RAR, the RAR message does not include the RAPID.

Optionally, the terminal dedicated data is at least one of a MAC SDU or a MAC CE.

Optionally, the execution module 123 is configured to perform any one of the following:
in a case in which the indication information indicates that the RAR message includes BI information, performing a fallback operation based on the BI information;
in a case in which the indication information indicates that the format of the RAR message is the format of fallback RAR, performing a fallback operation;
in a case in which the indication information indicates that the format of the RAR message is the format of success RAR, when the RAR message includes a contention resolution identifier and the contention resolution identifier is verified successfully, determining a random access procedure to be successful;
in a case in which the indication information indicates that the format of the RAR message is the format of success RAR, when the RAR message includes a RAPID and a contention resolution identifier and the RAPID and the contention resolution identifier are verified successfully, determining a random access procedure to be successful;
in a case in which the indication information indicates that the format of the RAR message is the format of success RAR, when the RAR message includes a contention resolution identifier and the contention resolution identifier is verified successfully, if the RAR message includes terminal dedicated data, performing a process of receiving related data based on information about the terminal dedicated data indicated by the indication information; and
in a case in which the indication information indicates that the format of the RAR message is the format of success RAR, when the RAR message includes a RAPID and a contention resolution identifier and the RAPID and the contention resolution identifier are verified successfully, if the RAR message includes terminal dedicated data, performing a process of receiving related data based on information about the terminal dedicated data indicated by the indication information.

Figure 13:
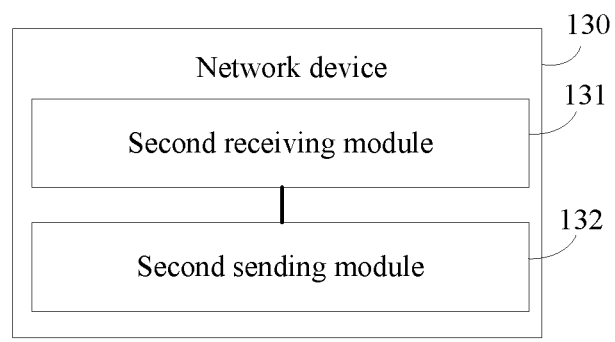
FIG. 13 is a first schematic structural diagram of a network device according to an embodiment of the present disclosure.

Refer to FIG. 13. FIG. 13 is a schematic structural diagram of a network device according to an embodiment of the present disclosure. As shown in FIG. 13, the network device 130 includes:
a second receiving module 131, configured to receive a random access message from a terminal;
a second sending module 132, configured to send an RAR message to the terminal, where
the RAR message includes indication information, and the indication information indicates a format type of the RAR message.

For the network device in this embodiment of the present disclosure, by using the indication information included in the RAR message, at least content included in an RAR message in a random access procedure (for example, a 2-step RACH procedure) can be clear. Therefore, a terminal can differentiate between different cases of response from a network device, thereby reducing a latency and processing complexity in a random access procedure.

Optionally, the indication information includes a first indicator field, and the first indicator field indicates that the RAR message includes the BI information or RAR information.

Optionally, the RAR information includes a RAPID.

Optionally, in a case in which the first indicator field indicates that the RAR message includes the RAR information, the indication information may include a second indicator field, and the second indicator field indicates that the format of the RAR message is a format of fallback RAR or a format of success RAR.

Optionally, in a case in which the indication information indicates that the format of the RAR message is the format of success RAR, the indication information may further include a third indicator field, and the third indicator field indicates whether the RAR message includes terminal dedicated data.

Optionally, when the length of the third indicator field is 1 bit, the third indicator field indicates whether the RAR message includes the terminal dedicated data; or when the length of the third indicator field is at least 1 bit, the third indicator field indicates whether the RAR message includes the terminal dedicated data and a quantity of units of the terminal dedicated data included in the RAR message in a case in which the RAR message includes the terminal dedicated data.

Optionally, the indication information may include a fourth indicator field, and the fourth indicator field indicates any one of the following:
the RAR message includes BI information;
the format of the RAR message is the format of fallback RAR;
the format of the RAR message is the format of success RAR;
whether the RAR message includes terminal dedicated data; and
the RAR message includes a quantity of units of the terminal dedicated data.

Optionally, in a case in which the indication information indicates that the format of the RAR message is a format of fallback RAR, the RAR message includes a RAPID; or
in a case in which the indication information indicates that the format of the RAR message is a format of success RAR, the RAR message does not include the RAPID.

Optionally, the terminal dedicated data is at least one of a MAC SDU or a MAC CE.

Figure 14:
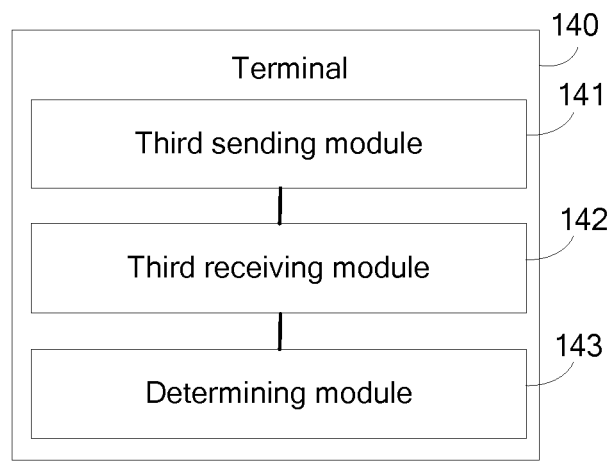
FIG. 14 is a second schematic structural diagram of a terminal according to an embodiment of the present disclosure.

Refer to FIG. 14. FIG. 14 is a schematic structural diagram of a terminal according to an embodiment of the present disclosure. As shown in FIG. 14, the terminal 140 includes:

a third sending module 141, configured to send random access message to a network device;

a third receiving module 142, configured to receive an RAR message from the network device, where the RAR message includes control information corresponding to a requirement of the terminal; and a determining module 143, configured to determine a random access procedure to be successful based on the control information.

For the terminal in this embodiment of the present disclosure, by using the control information included in the RAR message, at least content included in an RAR message in a random access procedure (for example, a 2-step RACH procedure) can be clear. Therefore, different cases of response from a network device can be differentiated, thereby reducing a latency and processing complexity in a random access procedure.

Optionally, the control information may include any one of the following items:

scheduling signaling for parsing a PDCCH by using a C-RNTI;

a TAC MAC CE;

scheduling signaling on new beam resources in a case of beam failure recovery;

a TAC of a preset length; and a TAC of a preset length and an uplink scheduling grant.

Optionally, in a case in which the control information includes the TAC of the preset length, the TAC of the preset length is indicated by using a logical channel identifier LCID; or the TAC of the preset length is indicated by using a first indicator field in a MAC header.

An embodiment of the present disclosure further provides a communications device, including a processor, a memory, and a computer program that is stored on the memory and executable on the processor. When the computer program is executed by the processor, various processes in the random access method embodiment shown in FIG. 2 are implemented, or various processes in the random access response method embodiment shown in FIG. 8 are implemented, or various processes in the random access method embodiment shown in FIG. 9 are implemented, and same technical effects can be achieved. To avoid repetition, details are not described again herein. The communications device may be selected as a terminal or a network device.

Figure 15:
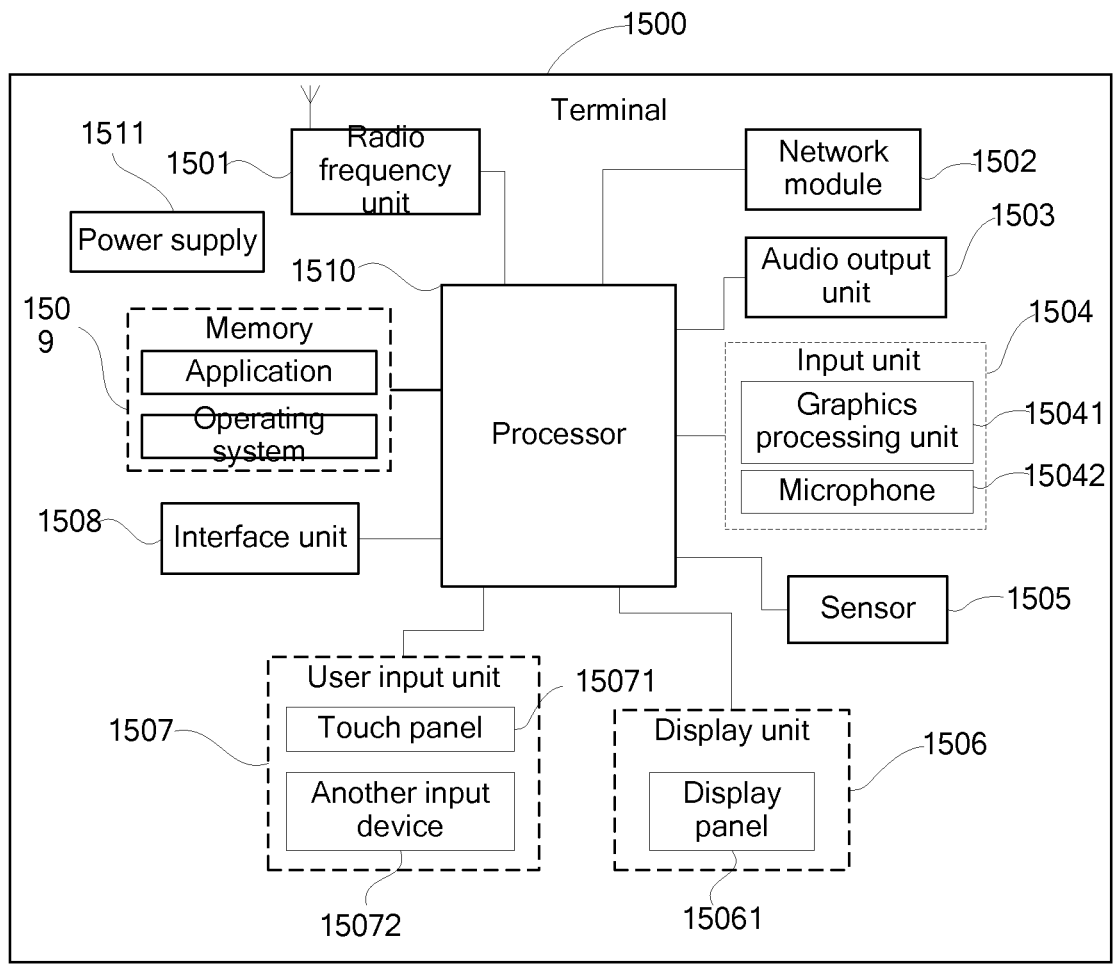
FIG. 15 is a third schematic diagram of a terminal according to an embodiment of the present disclosure.

FIG. 15 is a schematic diagram of a hardware structure of a terminal for implementing the embodiments of the present disclosure. The terminal 1500 includes but is not limited to: a radio frequency unit 1501, a network module 1502, an audio output unit 1503, an input unit 1504, a sensor 1505, a display unit 1506, a user input unit 1507, an interface unit 1508, a memory 1509, a processor 1510, a power supply 1511, and other components. A person skilled in the art can understand that the structure of the terminal shown in FIG. 15 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, a vehicle-mounted terminal, a wearable device, a pedometer, and the like.

Optionally, the radio frequency unit 1501 is configured to: send a random access message to a network device, and receive an RAR message from the network device, where the RAR message includes indication information, and the indication information indicates a format type of the RAR message; and the processor 1510 is configured to perform a corresponding random access operation based on the indication information.

Alternatively, the radio frequency unit 1501 is configured to: send a random access message to a network device, and receive an RAR message from the network device, where the RAR message includes control information corresponding to a requirement of the terminal; and the processor 1510 is configured to determine a random access procedure to be successful based on the control information.

In this embodiment of the present disclosure, at least content included in an RAR message in a random access procedure (for example, a 2-step RACH procedure) can be clear. Therefore, a terminal 1500 can differentiate between different cases of response from a network device, thereby reducing a latency and processing complexity in a random access procedure.

It should be noted that the terminal 1500 in this embodiment of the present disclosure can implement various processes implemented in the foregoing method embodiment shown in FIG. 2 or various processes implemented in the foregoing method embodiment shown in FIG. 8, and same beneficial effects can be achieved. To avoid repetition, details are not described herein again.

It should be understood that, in this embodiment of the present disclosure, the radio frequency unit 1501 may be configured to receive and send information or a signal during a phone call. For example, after receiving downlink data from a base station, the radio frequency unit 1501 sends the downlink data to the processor 1510 for processing; and sends uplink data to the base station. Generally, the radio frequency unit 1501 includes but is not limited to an antenna, at least one amplifier, a transceiver, a coupler, a low noise amplifier, a duplexer, and the like. In addition, the radio frequency unit 1501 may further communicate with a network and another device through a wireless communications system.

The terminal provides wireless broadband Internet access to a user through the network module 1502, for example, helps the user receive and send e-mails, browse web pages, and access streaming media, etc.

The audio output unit 1503 may convert audio data received by the radio frequency unit 1501 or the network module 1502 or stored in the memory 1509 into an audio signal, and output the audio signal into a sound. In addition, the audio output unit 1503 may further provide an audio output (for example, a call signal received voice, or a message received voice) related to a specific function executed by the terminal 1500. The audio output unit 1503 includes a loudspeaker, a buzzer, a receiver, and the like.

The input unit 1504 is configured to receive an audio or video signal. The input unit 1504 may include a graphics processing unit (GPU) 15041 and a microphone 15042. The graphics processing unit 15041 is configured to process image data of a static picture or a video obtained by an image capture apparatus (for example, a camera lens) in a video capture mode or an image capture mode. A processed image frame may be displayed on the display unit 1506. The image frame processed by the graphics processing unit 15041 may be stored in the memory 1509 (or another storage medium) or transmitted via the radio frequency unit 1501 or the network module 1502. The microphone 15042 may receive a sound and may process such a sound into audio data. The processed audio data may be converted, in a phone calling mode, into a format that may be transmitted to a mobile communication base station by using the radio frequency unit 1501 for output.

The terminal 1500 further includes at least one sensor 1505, for example, a light sensor, a motion sensor, and another sensor. For example, the light sensor includes an ambient light sensor and a proximity sensor, where the ambient light sensor can adjust brightness of a display panel 15061 based on brightness of ambient light, and the proximity sensor can turn off the display panel 15061 and/or backlight when the terminal 1500 is moved towards the ear. As a type of motion sensor, an accelerometer sensor may detect acceleration values in directions (that are generally three axes), and detect a value and a direction of gravity when the accelerometer sensor is static, and may be configured to: recognize a terminal posture (for example, screen switching between landscape and portrait modes, a related game, or magnetometer posture calibration), and perform a function related to vibration recognition (for example, a pedometer or a knock), and the like. The sensor 1505 may further include a fingerprint sensor, a pressure sensor, an iris sensor, a molecular sensor, a gyroscope, a barometer, a hygrometer, a thermometer, an infrared sensor, and the like. Details are not described herein again.

The display unit 1506 is configured to display information entered by a user or information provided for the user. The display unit 1506 may include a display panel 15061. The display panel 15061 may be configured in a form of a liquid crystal display (LCD), an organic light-emitting diode (OLED), or the like.

The user input unit 1507 may be configured to receive input numeric or character information, and generate key signal inputs related to user settings and function control of the terminal. The user input unit 1507 includes a touch panel 15071 and another input device 15072. The touch panel 15071 is also referred to as a touchscreen, and may collect a touch operation of the user on or near the touch panel 15071 (for example, an operation performed on or near the touch panel 15071 by the user by using any appropriate object or accessory such as a finger or a stylus). The touch panel 15071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 1510, and receives and executes a command from the processor 1510. In addition, the touch panel 15071 may be implemented in various forms, such as a resistance type, a capacitance type, an infrared ray, and a surface acoustic wave. In addition to the touch panel 15071, the user input unit 1507 may further include another input device 15072. The another input device 15072 may include but is not limited to at least one of a physical keyboard, a functional button (such as a volume control button or a power on/off button), a trackball, a mouse, or a joystick. Details are not described herein.

The touch panel 15071 may cover the display panel 15061. After detecting the touch operation on or near the touch panel 15071, the touch panel 15071 transmits the touch operation to the processor 1510 to determine a type of a touch event, and then the processor 1510 provides corresponding visual output on the display panel 15061 based on the type of the touch event. In FIG. 15, although the touch panel 15071 and the display panel 15061 are used as two independent parts to implement input and output functions of the terminal, in some embodiments, the touch panel 15071 and the display panel 15061 may be integrated to implement the input and output functions of the terminal. This is not limited herein.

The interface unit 1508 is an interface connecting an external apparatus and the terminal 1500. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 1508 may be configured to: receive input (for example, data information and power) from the external apparatus, and transmit the received input to one or more elements inside the terminal 1500; or may be configured to transmit data between the terminal 1500 and the external apparatus.

The memory 1509 may be configured to store a software program and various data. The memory 1509 may mainly include a program storage area and a data storage area. The program storage area may store an operating system, an application program (for example, a sound play function or an image play function) required for at least one function, and the like. The data storage area may store data created based on use of the mobile phone (for example, audio data and a phone book), and the like. In addition, the memory 1509 may include a high-speed random access memory, and may further include a nonvolatile memory, for example, at least one disk storage device, a flash memory, or another volatile solid-state storage device.

The processor 1510 is a control center of the terminal, and is connected to all parts of the entire a terminal by using various interfaces and lines, and performs various functions of the terminal and processes data by running or executing the software program and/or a module that are stored in the memory 1509 and invoking the data stored in the memory 1509, to implement overall monitoring on the terminal. The processor 1510 may include one or more processing units. Optionally, an application processor and a modem processor may be integrated into the processor 1510. The application processor mainly processes an operating system, a user interface, an application, and the like. The modem processor mainly processes wireless communication. It can be understood that the foregoing modem processor may alternatively not be integrated in the processor 1510.

The terminal 1500 may further include a power supply 1511 (for example, a battery) that supplies power to various components. Optionally, the power supply 1511 may be logically connected to the processor 1510 through a power supply management system, thereby achieving functions of managing charging, discharging, and power consumption through the power supply management system.

In addition, the terminal 1500 may further include some functional modules not shown. Details are not described herein again.

Figure 16:
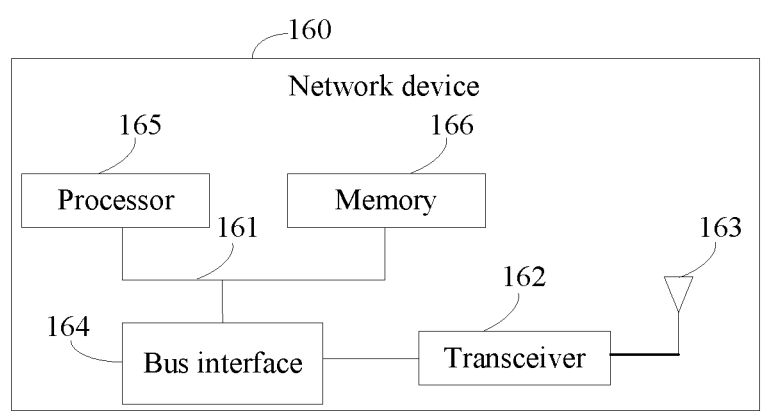
FIG. 16 is a second schematic structural diagram of a network device according to an embodiment of the present disclosure.

FIG. 16 is a schematic diagram of a hardware structure of a network device according to various embodiments of the present disclosure. The network device 160 includes but is not limited to a bus 161, a transceiver 162, an antenna 163, a bus interface 164, a processor 165, and a memory 166.

In this embodiment of the present disclosure, the network device 160 further includes: a computer program stored in the memory 166 and executable on the processor 165. Optimally, when the computer program is executed by the processor 165, the following steps are further implemented:

A random access message is received from a terminal; and an RAR message is sent to the terminal, where the RAR message includes indication information, and the indication information indicates a format type of the RAR message.

In this embodiment of the present disclosure, the network device 160 can implement processes implemented in the foregoing method embodiment shown in FIG. 9, and a same beneficial effect can be achieved. To avoid repetition, details are not described herein again.

The transceiver 162 is configured to receive and send data under control of the processor 165.

In FIG. 16, for a bus architecture (represented by the bus 161), the bus 161 may include any quantity of interconnecting buses and bridges, and the bus 161 interconnects various circuits of one or more processors represented by the processor 165 and a memory represented by the memory 166. The bus 161 may further link together various other circuits, such as a peripheral device, a voltage regulator, and a power management circuit. These are all well known in the art. Therefore, this specification provides no further description. The bus interface 164 provides an interface between the bus 161 and the transceiver 162. The transceiver 162 may be one or more elements, for example, a plurality of receivers and transmitters, and provides a unit that is configured to communicate with various other apparatuses on a transmission medium. Data processed by the processor 165 is transmitted on a wireless medium by using the antenna 163. The antenna 163 receives data and transmits the data to the processor 165.

The processor 165 is responsible for managing the bus 161 and general processing, and may further provide various functions, including timing, peripheral interfacing, voltage regulation, power management, and another control function. The memory 166 may be configured to store data used by the processor 165 when performing an operation.

Optionally, the processor 165 may be a central processing unit (CPU), an application specific integrated circuits (ASIC), a field-programmable gate array (FPGA), or a complex programmable logic device (CPLD).

An embodiment of the present disclosure further provides a non-transitory computer-readable storage medium, where the no-transitory computer-readable storage medium includes a computer program. When the computer program is executed by a processor, various processes in the random access method embodiment shown in FIG. 2 are implemented, or various processes in the random access response method embodiment shown in FIG. 8 are implemented, or various processes in the random access method embodiment shown in FIG. 9 are implemented, and same technical effects can be achieved. To avoid repetition, details are not described again herein. The non-transitory computer-readable storage medium is, for example, a read-only memory (ROM), a random access memory (RAM), a magnetic disk, or an optical disc.

It should be noted that in this specification, terms "include", "comprise" or any other variants thereof are intended to cover non-exclusive inclusion, so that a process, a method, an article or an apparatus that includes a series of elements not only includes those elements, but also includes other elements that are not explicitly listed, or includes inherent elements of the process, method, article, or apparatus. In absence of more constraints, an element preceded by "includes a . . . " does not preclude the existence of other identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the related technologies may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely examples instead of restrictions. With enlightenment because of the present disclosure, a person of ordinary skills in the art may make many forms without departing from the aim of the present disclosure and the protection scope of the claims, all of which fall within the protection of the present disclosure.

What is claimed is:

1. A random access method applied to a terminal, comprising:

sending a random access message to a network device;

receiving a random access response (RAR) message from the network device, wherein the RAR message comprises indication information, and the indication information indicates a format type of the RAR message; and performing a corresponding random access operation based on the indication information;

wherein in a case in which the indication information indicates that the format of the RAR message is a format of success RAR, the indication information further comprises a third indicator field, and the third indicator field indicates whether the RAR message comprises terminal dedicated data.

2. The method according to claim 1, wherein the indication information comprises a second indicator field, and the second indicator field indicates that the format of the RAR message is a format of fallback RAR or a format of success RAR.

3. The method according to claim 1, wherein in a case in which a length of the third indicator field is one bit, the third indicator field indicates whether the RAR message comprises the terminal dedicated data; or in a case in which the length of the third indicator field is at least one bit, the third indicator field indicates whether the RAR message comprises the terminal dedicated data and a quantity of units of the terminal dedicated data comprised in the RAR message in a case in which the RAR message comprises the terminal dedicated data.

4. The method according to claim 1, wherein the indication information comprises a fourth indicator field, and the fourth indicator field indicates any one of following:

the RAR message comprises backoff indicator (BI) information; and the format of the RAR message is a format of success RAR.

5. The method according to claim 1, wherein in a case in which the indication information indicates that the format of the RAR message is a format of fallback RAR, the RAR message comprises a random access preamble identifier (RAPID); or
  in a case in which the indication information indicates that the format of the RAR message is a format of success RAR, the RAR message does not comprise the RAPID.

6. The method according to claim 1, wherein the terminal dedicated data is at least one of a media access control (MAC) service data unit (SDU) or a MAC control element (CE).

7. The method according to claim 1, wherein the performing a corresponding random access operation based on the indication information comprises at least one of:
  in a case in which the indication information indicates that the RAR message comprises backoff indicator (BI) information, performing a fallback operation based on the BI information;
  in a case in which the indication information indicates that the format of the RAR message is a format of fallback RAR, performing the fallback operation;
  in a case in which the indication information indicates that the format of the RAR message is a format of success RAR, and the RAR message comprises a contention resolution identifier and the contention resolution identifier is verified successfully, determining a random access procedure to be successful;
  in a case in which the indication information indicates that the format of the RAR message is a format of success RAR, and the RAR message comprises a random access preamble identifier (RAPID) and a contention resolution identifier, and the RAPID and the contention resolution identifier are verified successfully, determining a random access procedure to be successful;
  in a case in which the indication information indicates that the format of the RAR message is a format of success RAR, and the RAR message comprises a contention resolution identifier, and the contention resolution identifier is verified successfully, if the RAR message comprises terminal dedicated data, performing a process of receiving related data based on information about the terminal dedicated data indicated by the indication information; or
  in a case in which the indication information indicates that the format of the RAR message is a format of success RAR, and the RAR message comprises a RAPID and a contention resolution identifier and the RAPID and the contention resolution identifier are verified successfully, if the RAR message comprises terminal dedicated data, performing a process of receiving related data based on information about the terminal dedicated data indicated by the indication information.

8. A random access response method applied to a network device, comprising:
  receiving a random access message from a terminal;
  sending a random access response (RAR) message to the terminal, wherein
  the RAR message comprises indication information, and the indication information indicates a format type of the RAR message; wherein
  in a case in which the indication information indicates that the format of the RAR message is a format of success RAR, the indication information further comprises a third indicator field, and the third indicator field indicates whether the RAR message comprises terminal dedicated data.

9. The method according to claim 8, wherein the indication information comprises a second indicator field, and the second indicator field indicates that the format of the RAR message is a format of fallback RAR or a format of success RAR.

10. The method according to claim 8, wherein in a case in which a length of the third indicator field is one bit, the third indicator field indicates whether the RAR message comprises the terminal dedicated data; or
  in a case in which the length of the third indicator field is at least one bit, the third indicator field indicates whether the RAR message comprises the terminal dedicated data and a quantity of units of the terminal dedicated data comprised in the RAR message in a case in which the RAR message comprises the terminal dedicated data.

11. The method according to claim 8, wherein the indication information comprises a fourth indicator field, and the fourth indicator field indicates any one of following:
  the RAR message comprises backoff indicator (BI) information; and
  the format of the RAR message is a format of success RAR.

12. The method according to claim 8, wherein in a case in which the indication information indicates that the format of the RAR message is a format of fallback RAR, the RAR message comprises a random access preamble identifier (RAPID); or
  in a case in which the indication information indicates that the format of the RAR message is a format of success RAR, the RAR message does not comprise the RAPID.

13. The method according to claim 8, wherein
  the terminal dedicated data is at least one of a media access control (MAC) service data unit (SDU) or a MAC control element (CE).

14. A terminal, comprising a memory, a processor, and a computer program that is stored on the memory and executable on the processor, wherein the computer program, when executed by the processor, causes the terminal to perform:
  sending a random access message to a network device;
  receiving a random access response (RAR) message from the network device, wherein the RAR message comprises indication information, and the indication information indicates a format type of the RAR message; and
  performing a corresponding random access operation based on the indication information;
  wherein
  in a case in which the indication information indicates that the format of the RAR message is a format of success RAR, the indication information further comprises a third indicator field, and the third indicator field indicates whether the RAR message comprises terminal dedicated data.

15. The terminal according to claim 14, wherein the indication information comprises a second indicator field, and the second indicator field indicates that the format of the RAR message is a format of fallback RAR or a format of success RAR.

16. The terminal according to claim 14, wherein in a case in which a length of the third indicator field is one bit, the third indicator field indicates whether the RAR message comprises the terminal dedicated data; or
  in a case in which the length of the third indicator field is at least one bit, the third indicator field indicates whether the RAR message comprises the terminal dedicated data and a quantity of units of the terminal dedicated data comprised in the RAR message in a case in which the RAR message comprises the terminal dedicated data.

17. The terminal according to claim 14, wherein the indication information comprises a fourth indicator field, and the fourth indicator field indicates any one of:

the RAR message comprises backoff indicator (BI) information; and the format of the RAR message is a format of success RAR.

18. The terminal according to claim 14, wherein in a case in which the indication information indicates that the format of the RAR message is a format of fallback RAR, the RAR message comprises a random access preamble identifier (RAPID); or in a case in which the indication information indicates that the format of the RAR message is a format of success RAR, the RAR message does not comprise the RAPID.

19. The terminal according to claim 14, wherein the terminal dedicated data is at least one of a media access control (MAC) service data unit (SDU) or a MAC control element (CE).

20. The terminal according to claim 14, wherein the performing a corresponding random access operation based on the indication information comprises at least one of:

in a case in which the indication information indicates that the RAR message comprises backoff indicator (BI) information, performing a fallback operation based on the BI information;

in a case in which the indication information indicates that the format of the RAR message is a format of fallback RAR, performing the fallback operation;

in a case in which the indication information indicates that the format of the RAR message is a format of success RAR, and the RAR message comprises a contention resolution identifier and the contention resolution identifier is verified successfully, determining a random access procedure to be successful;

in a case in which the indication information indicates that the format of the RAR message is a format of success RAR, and the RAR message comprises a random access preamble identifier (RAPID) and a contention resolution identifier, and the RAPID and the contention resolution identifier are verified successfully, determining a random access procedure to be successful;

in a case in which the indication information indicates that the format of the RAR message is a format of success RAR, and the RAR message comprises a contention resolution identifier, and the contention resolution identifier is verified successfully, if the RAR message comprises terminal dedicated data, performing a process of receiving related data based on information about the terminal dedicated data indicated by the indication information; or in a case in which the indication information indicates that the format of the RAR message is a format of success RAR, and the RAR message comprises a RAPID and a contention resolution identifier and the RAPID and the contention resolution identifier are verified successfully, if the RAR message comprises terminal dedicated data, performing a process of receiving related data based on information about the terminal dedicated data indicated by the indication information.

\* \* \* \* \*